US007966094B2

(12) United States Patent
Ban et al.

(10) Patent No.: US 7,966,094 B2
(45) Date of Patent: Jun. 21, 2011

(54) WORKPIECE PICKING APPARATUS

(75) Inventors: Kazunori Ban, Yamanashi (JP); Ichiro Kanno, Yokohama (JP); Keisuke Watanabe, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 387 days.

(21) Appl. No.: 11/863,670

(22) Filed: Sep. 28, 2007

(65) Prior Publication Data
US 2008/0082213 A1 Apr. 3, 2008

(30) Foreign Application Priority Data
Sep. 29, 2006 (JP) ................ 2006-266903

(51) Int. Cl.
*G05B 15/00* (2006.01)
(52) U.S. Cl. ......... 700/260; 700/213; 700/217; 700/223
(58) Field of Classification Search ............ 700/260, 700/213, 217, 223; 901/50
See application file for complete search history.

(56) References Cited

U.S. PATENT DOCUMENTS

| 3,804,270 | A * | 4/1974 | Michaud et al. ............ 414/267 |
| 4,187,051 | A * | 2/1980 | Kirsch et al. ............ 414/744.3 |
| 4,305,130 | A * | 12/1981 | Kelley et al. ............ 700/259 |
| 4,412,293 | A * | 10/1983 | Kelley et al. ............ 700/259 |
| 4,613,269 | A * | 9/1986 | Wilder et al. ............ 700/259 |
| 4,862,373 | A * | 8/1989 | Meng ............ 701/209 |
| 4,985,846 | A * | 1/1991 | Fallon ............ 382/153 |
| 5,530,791 | A * | 6/1996 | Okabayashi ............ 700/255 |
| 7,110,859 | B2 * | 9/2006 | Shibata et al. ............ 700/245 |
| 7,123,992 | B2 | 10/2006 | Ban et al. |
| 7,421,314 | B2 * | 9/2008 | Stoddard et al. ............ 700/245 |
| 2004/0117066 | A1 * | 6/2004 | Ban et al. ............ 700/245 |
| 2004/0243282 | A1 * | 12/2004 | Watanabe et al. ............ 700/259 |
| 2007/0177790 | A1 * | 8/2007 | Ban et al. ............ 382/153 |
| 2007/0213874 | A1 * | 9/2007 | Oumi et al. ............ 700/245 |
| 2007/0274812 | A1 * | 11/2007 | Ban et al. ............ 414/217 |

FOREIGN PATENT DOCUMENTS

| EP | 0951968 A2 | 10/1999 |
| EP | 1256860 A2 | 11/2002 |
| EP | 1428634 A2 | 6/2004 |
| EP | 1449626 A1 | 8/2004 |
| JP | 63163975 A | 7/1988 |
| JP | 3202290 A | 9/1991 |
| JP | 2004160567 A | 6/2004 |
| WO | 2007083039 A2 | 7/2007 |

OTHER PUBLICATIONS

EP Search Report for EP07019095.4 mailed Jan. 5, 2009.
Notice of Reasons for Rejection for JP2006-266903 mailed Aug. 19, 2008.

* cited by examiner

*Primary Examiner* — Khoi Tran
*Assistant Examiner* — Kyung J Kim
(74) *Attorney, Agent, or Firm* — Lowe Hauptman Ham & Berner LLP

(57) ABSTRACT

A workpiece picking apparatus includes a robot, a workpiece recognition device for recognizing the workpieces located in a wide area, an accurate measurement device for accurately measuring the three-dimensional position of the workpiece, a workpiece select device for selecting the workpiece to be picked, and an NG workpiece storage device for storing information on the rough position of an failed NG workpiece when the measurement of the three-dimensional position or the picking for the workpiece has failed. The workpiece select device excludes the NG workpiece stored in the NG workpiece storage device and selects the next workpiece to be measured. The robot picks the selected workpiece based on the three-dimensional position of the workpiece measured by the accurate measurement device.

10 Claims, 8 Drawing Sheets

FIG.4

| WORKPIECE No. i | POSITION Vt (PIXEL) | POSITION Hz (PIXEL) | ANGLE $\theta$ (°) | SIZE S (%) |
|---|---|---|---|---|
| 1 | 411 | 38 | 176 | 89 |
| 2 | 329 | 423 | -6 | 98 |
| 3 | 120 | 602 | -85 | 111 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| k | 376 | 571 | 37 | 107 |

FIG.5

| WORKPIECE No. j | NUMBER Aj OF TIMES THE FAILED WORKPIECE IS RESIDING IN LIST | NUMBER Bj OF TIMES THE FAILED WORKPIECE HAS FAILED TO CORRESPOND TO WORKPIECE DETECTED BY OVERALL SEARCH | POSITION Vt (PIXEL) | POSITION Hz (PIXEL) | ANGLE θ (°) | SIZE S (%) |
|---|---|---|---|---|---|---|
| 1 | $A_1=3$ | $B_1=0$ | 232 | 538 | 39 | 102 |
| 2 | $A_2=1$ | $B_2=1$ | 109 | 38 | 124 | 94 |
| 3 | $A_3=2$ | $B_3=0$ | 327 | 424 | -5 | 98 |
| .. | .. | .. | .. | .. | .. | .. |
| .. | .. | .. | .. | .. | .. | .. |
| .. | .. | .. | .. | .. | .. | .. |
| m | $A_m=1$ | $B_m=2$ | 387 | 221 | -38 | 101 |

WORKPIECE PICKING APPARATUS

RELATED APPLICATIONS

The present application is based on, and claims priority from, Japanese Application No. 2006-266903, filed Sep. 29, 2006, the disclosure of which is hereby incorporated by reference herein in its entirety.

BACKGROUND OF THE INVENTION

1. Field of the Invention

The present invention relates to a workpiece picking apparatus for picking workpieces sequentially from a group of workpieces using a robot.

2. Description of the Related Art

A robot is used in various industries to hold, transport or otherwise handle a workpiece. These robot applications include what is called "bin picking" in which individual workpieces are picked from workpieces placed randomly in a container or on a pallet. In a bin picking application, the roughly determined position of the workpiece to be picked is calculated based on a two-dimensional image of a wide area taken by an overall search sensor using a CCD camera or the like, and a three-dimensional position and orientation of a specific workpiece is then accurately measured based on the imaging data of a narrow area obtained by an accurate measurement sensor such as a three-dimensional visual sensor. After that, based on the three-dimensional position and orientation of the workpiece thus measured, the workpiece is picked by the robot. Known three-dimensional visual sensors include one type in which a slit light or spot light is projected on an object to form, on the surface of the object, an optical zone or an optical point higher in brightness than the surrounding area, which is observed by an imaging device such as a CCD camera, and then three-dimensional measurement of the object is carried out based on triangulation, and another type in which the position of an object is three-dimensionally measured by a stereo image processing using two imaging devices.

For example, WO97/24206 discloses a composite sensor robot system using a combination of a CCD camera for obtaining the two-dimensional image of a wide area and a laser sensor for measuring the three-dimensional position of a workpiece in a narrow area. Further, Japanese Unexamined Patent Publication No. 2004-50390 discloses a technique for determining picking priority orders for a multiplicity of detected workpieces based on a partial feature or features of each workpiece detected by a camera for imaging a wide area.

As described above, in what is called "bin picking" application, the three-dimensional position and orientation of the workpiece are detected by a combination of the workpiece recognition carried out based on the imaging of a wide area (hereinafter referred to as "overall search") and the accurate measurement of the three-dimensional position and orientation of the workpiece carried out based on the imaging of a narrow area (hereinafter referred to as "accurate measurement"), and the robot then picks the particular workpiece based on the three-dimensional position and orientation of the workpiece thus detected.

However, in some cases, a workpiece recognized by the overall search cannot be accurately measured. For example, as shown in FIG. 8A, in the case where an overall search sensor (wide area sensor) located above a container box in the figure for imaging a wide area and an accurate measurement sensor (narrow area sensor) located below the overall search sensor in the figure for imaging the specific workpiece in a narrow area are used and the directions to image the workpiece in the overall search and the accurate measurement are different from each other, the workpiece visible by the overall search sensor located at an upper position may be hidden behind another workpiece and not visible by the accurate measurement sensor located at a lower position than the overall search sensor, thereby sometimes resulting in an inaccurate measurement. Also, as shown in FIG. 8B, the workpiece visible by the overall search sensor located at an upper position may be invisible by the accurate measurement sensor located at a lower position due to a wall of the container box or the like.

Further, some workpiece for which the three-dimensional position and orientation can be detected by accurate measurement cannot be held by the robot. For example, in the case where an accurately measured workpiece is located in the neighborhood of a wall of the container box as shown in FIG. 8C, although accurate measurement can be carried out by the accurate measurement sensor, the robot interferes with a wall of the container box and cannot approach the workpiece. Therefore, in the actual workpiece picking apparatus, it is common practice to store in advance the shapes of the container box and robot in a robot control unit, and to check before the robot moves whether the robot will interfere with other objects thereby preventing interference.

In overall search, the workpieces suitable for the accurate measurement and picking are selected by being assigned a priority order using the technique disclosed, for example, in Japanese Unexamined Patent Publication No. 2004-50390 described above. However, the problem described above is difficult to completely avoid. Therefore, unless special consideration is given to the subsequent process for the workpiece which, although detected by overall search, has failed to be successfully picked for some reason such as due to the problem described above, trials for accurate measurement and picking of the particular workpiece are repeated, often resulting in cycle time delay and the suspension of the process.

SUMMARY OF THE INVENTION

Accordingly, it is an object of the present invention to provide an apparatus for picking the workpiece using a robot based on the workpiece recognition and measurement carried out by a visual sensor, wherein unnecessary wasteful steps are eliminated and the process of the apparatus as a whole is improved in efficiency.

In order to achieve the object described above, according to the present invention, there is provided a workpiece picking apparatus which includes a robot for holding the workpiece, a workpiece recognition device for recognizing the rough positions of individual workpieces included in a group of workpieces located within a relatively wide area, an accurate measurement device for accurately measuring the three-dimensional position of a workpiece included in a relatively narrow area, and a workpiece select device for selecting the workpiece to be picked from the group of workpieces recognized by the workpiece recognition device, the accurate measurement device accurately measuring the three-dimensional position of the workpiece selected by the workpiece select device, the robot picking the selected workpiece from the group of workpieces based on the three-dimensional position of the workpiece measured by the accurate measurement device, wherein the workpiece picking apparatus further includes an NG workpiece storage device storing information on the rough position of a failed workpiece when the accurate measurement device has failed the measurement of the three-dimensional position of the workpiece or the robot has failed the picking of the workpiece, the workpiece select device excluding the failed workpiece for which the measurement of the three-dimensional position or the picking has failed, from the group of workpieces recognized by the workpiece recognition device, based on the information on the rough position of individual workpieces recognized by the workpiece recognition device and the information stored in the NG workpiece storage device, and selecting the next workpiece to be measured by the accurate measurement device.

In the workpiece picking apparatus described above, the accurate measurement device preferably is configured to further measure the orientation of the selected workpiece.

Also, the workpiece recognition device and the accurate measurement device may be configured of the same device.

In one embodiment, the NG workpiece storage device is configured to compare the information on the rough position of the failed workpiece stored in the NG workpiece storage device with the information on the rough position of each of the group of workpieces recognized by the workpiece recognition device and, when the workpiece corresponding to the failed workpiece stored in the NG workpiece storage device does not exist in the group of workpieces recognized by the workpiece recognition device, delete the information on this failed workpiece.

In another embodiment, the NG workpiece storage device is configured to compare the information on the rough position of the failed workpiece stored in the NG workpiece storage device with the information on the rough position of each of the group of workpieces recognized by the workpiece recognition device and, when it is continuously confirmed a predetermined number of times that the workpiece corresponding to the failed workpiece stored in the NG workpiece storage device does not exist in the group of workpieces recognized by the workpiece recognition device, delete the information on this failed workpiece.

In further embodiment, the NG workpiece storage device is configured to delete the information on the failed workpiece when a cycle from the step of recognizing the group of workpieces by the workpiece recognition device to the step of picking the workpiece by the robot is repeated a predetermined number after the information on the rough position of the failed workpiece for which the measurement of the three-dimensional position or the picking has failed is stored.

In the workpiece picking apparatus according to the present invention, the failed workpiece for which the accurate measurement by the accurate measurement device or the picking by the robot has failed in the past is stored as the NG workpiece in the NG workpiece storage device, the workpiece stored in the NG workpiece storage device is excluded from the group of workpieces recognized by the workpiece recognition device, and the next workpiece to be accurately measured and picked is selected. This can avoid executing the accurate measurement step and the picking step for the failed workpiece again and thereby repeating the failure. As a result, the delay in cycle time or the process suspension can be prevented.

By deleting the information on the failed workpiece from the NG workpiece storage device when the predetermined condition is satisfied, the accurate measurement or the picking of the failed workpiece can be tried again, when the accurate measurement and the picking of the failed workpiece, for which the accurate measurement and the picking has previously failed, becomes possible by the state of the failed workpiece changing while repeating the picking jobs. As a result, the processing efficiency of the picking apparatus can be improved.

BRIEF DESCRIPTION OF THE DRAWINGS

The above and other objects, features and advantages of the present invention will be described in more detail below based on preferred embodiments of the present invention with reference to the accompanying drawings, in which:

FIG. 4 shows an example of the overall search workpiece data list for the workpieces recognized by overall search;

FIG. 5 shows an example of the black list stored in an NG workpiece storage unit;

DETAILED DESCRIPTION OF THE INVENTION

Figure 1:
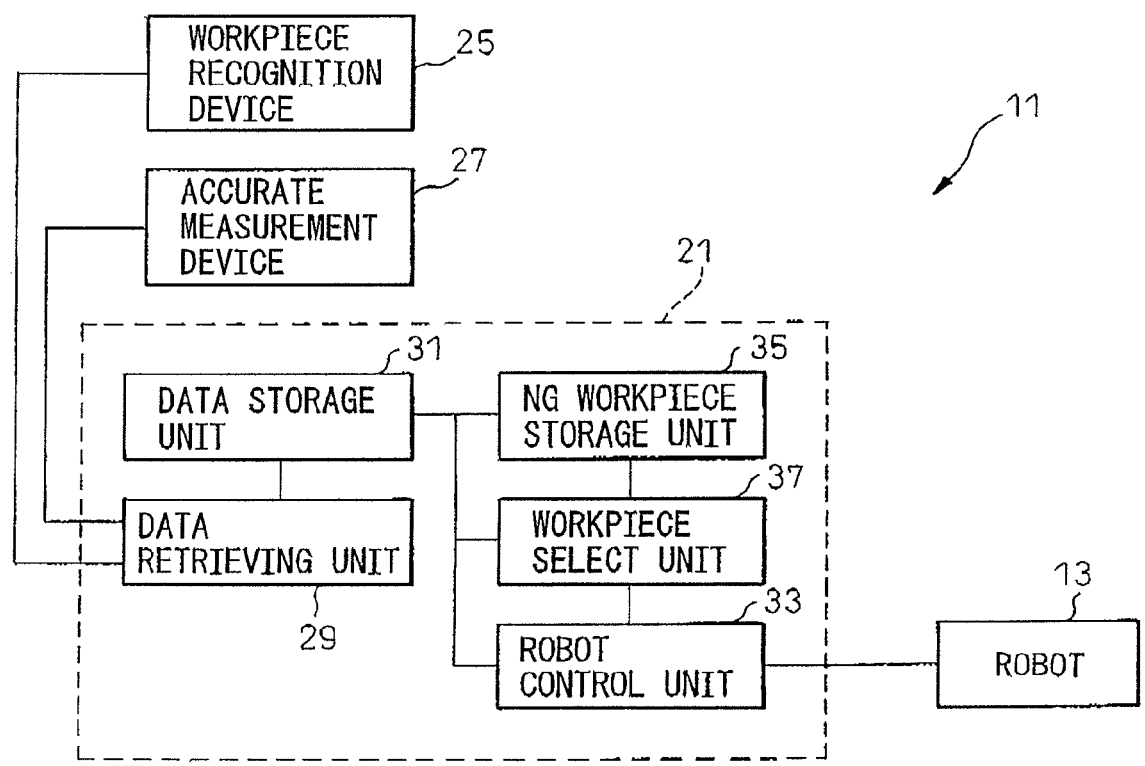
FIG. 1 is a function block diagram of a workpiece picking apparatus according to the present invention.

The embodiments of a workpiece picking apparatus according to the present invention will be described below with reference to the drawings.

First, with reference to FIGS. 1 and 2, the general configuration of the workpiece picking apparatus according to the present invention will be described. As shown in FIG. 2, a workpiece picking apparatus 11 includes a robot 13 for holding and transporting the workpiece W, a wide area sensor 15 capable of imaging a wide area, a narrow area sensor 17 capable of imaging an area narrower than the wide area sensor 15, an image processing device 19 for processing the images taken by the wide area sensor 15 and the narrow area sensor 17, and a control device 21 for controlling the robot 13, the wide area sensor 15, narrow area sensor 17, the image processing device 19 and other devices.

The robot 13, which is installed in front of a container box 23 or a pallet loaded with a plurality of workpieces W at random, picks the selected one of the workpieces W in the container box 23 or on the pallet and sends it to the next process, based on commands from the control device 21. The robot 13 can be of any arbitrary type which can hold and transport the workpiece W. According to the embodiment shown in FIG. 2, a multi-joint robot configured of a plurality of arms and hands coupled to joints is used.

The wide area sensor 15 is adapted such that it can image the whole group of workpieces W in the container box 23 or on the pallet, and has a solution of such a degree as to detect the rough positions (appropriate positions) of the individual workpieces W included in the group of workpieces W based on a taken image. In the embodiment shown in FIG. 2, a two-dimensional imaging camera such as a CCD camera or CMOS camera is used as the wide area sensor 15, and is arranged above the container box 23 to cover the whole container box 23 in the visual field. A three-dimensional visual camera may be used as the wide area sensor 15.

The narrow area sensor 17 is adapted such that it can image a specific workpiece W selected with a high resolution and accurately measure the three-dimensional position and orientation of the workpiece W based on the imaging data. In the embodiment shown in FIG. 2, a three-dimensional visual sensor mounted at the forward end of the hand of the robot 13 is used. A three-dimensional visual sensor in which a slit light or a spot light is projected on an object to form an optical band or an optical spot higher in brightness than the surrounding parts on the surface of the object and the optical band or the optical spot is observed by an imaging device such as a CCD camera to implement three-dimensional measurement of the object by triangulation, or a type of three-dimensional visual sensor in which the position and orientation of an object are three-dimensionally measured by the stereo image processing using two imaging devices can be used as the three-dimensional visual sensor.

The image processing device 19 is a well-known type having a CPU, a data memory, a frame memory, an image processor and an interface etc., and processes the imaging data obtained by the wide area sensor 15 or the narrow area sensor 17 to detect or measure the position and orientation of the workpiece W. Specifically, the image processing device 19 processes the image or the two-dimensional imaging data obtained by the wide area sensor 15 to detect at least the rough position of the workpiece W and processes the image or the three-dimensional imaging data obtained by the narrow area sensor 17 to measure at least the three-dimensional position and orientation of the workpiece W. In this way, the wide area sensor 15 and the image processing device 19 constitute a workpiece recognition device 25 (see FIG. 1) which recognizes individual workpieces included in the group of workpieces located in a wide area by imaging the wide area and detects the rough positions of the workpieces. The narrow area sensor 17 and the image processing device 19, on the other hand, constitute an accurate measurement device 27 (see FIG. 1) which images the narrow area including the specific workpiece selected and accurately measures the three-dimensional position and orientation of the workpiece based on the imaging data.

Figure 2:
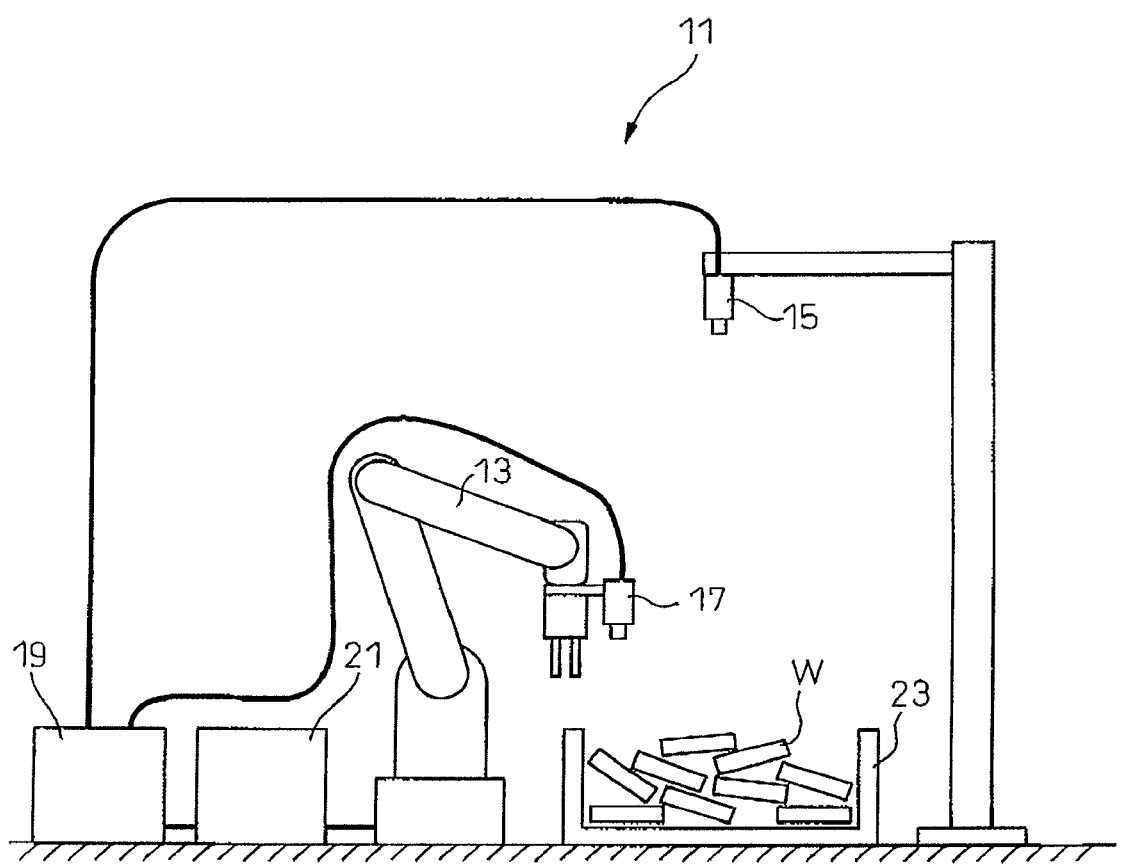
FIG. 2 is a diagram showing a general configuration of a workpiece picking apparatus according to an embodiment of the present invention.

As shown in FIG. 1, the control device 21 includes a data retrieving unit 29, a data storage unit 31, a robot control unit 33, an NG workpiece storage unit 35, and a workpiece select unit 37. The data retrieving unit 29 retrieves data on the rough position, three-dimensional position and/or orientation of the workpiece W output from the workpiece recognition device 25 and the accurate measurement device 27, and sends the retrieved data to the data storage unit 31 and the robot control unit 33. The data storage unit 31 stores the data retrieved through the data retrieving unit 29 and, if required, supplies it the NG workpiece storage unit 35 and the workpiece select unit 37. When the accurate measurement device 27 fails to measure the three-dimensional position or orientation of the workpiece W or the robot 13 fails to hold and pick the workpiece W, the NG workpiece storage unit 35 stores, as a black list, information on the rough position detected by the workpiece recognition device 25 with regard to the workpiece Wf (hereinafter referred to as NG workpiece) for which the measurement of the three-dimensional position and orientation or the holding and picking have failed. The workpiece select unit 37 deletes the NG workpiece Wf from the group of workpieces W recognized by the workpiece recognition device 25 and determines the priority orders of the individual workpieces remaining in the workpiece group by deleting, based on the information on the rough positions, etc., of individual workpieces W included in the group of workpieces W recognized by processing the image or the two-dimensional imaging data from the wide area sensor 15 and the information on the rough positions of the NG workpieces Wf stored in the NG workpiece storage device 35, thereby selecting the workpiece W to be picked by the robot 13 in accordance with the priority order thus determined. The robot control unit 33 controls the robot 13 based on the rough position information of the selected workpiece W, and the accurate measurement device 27 (i.e. the narrow area sensor 17 and the image processing device 19) accurately measures the workpiece W. The robot control unit 33 also controls the robot 13, based on the three-dimensional position and orientation of the workpiece W measured by the accurate measurement device 27, to pick the workpiece W.

Figure 3:
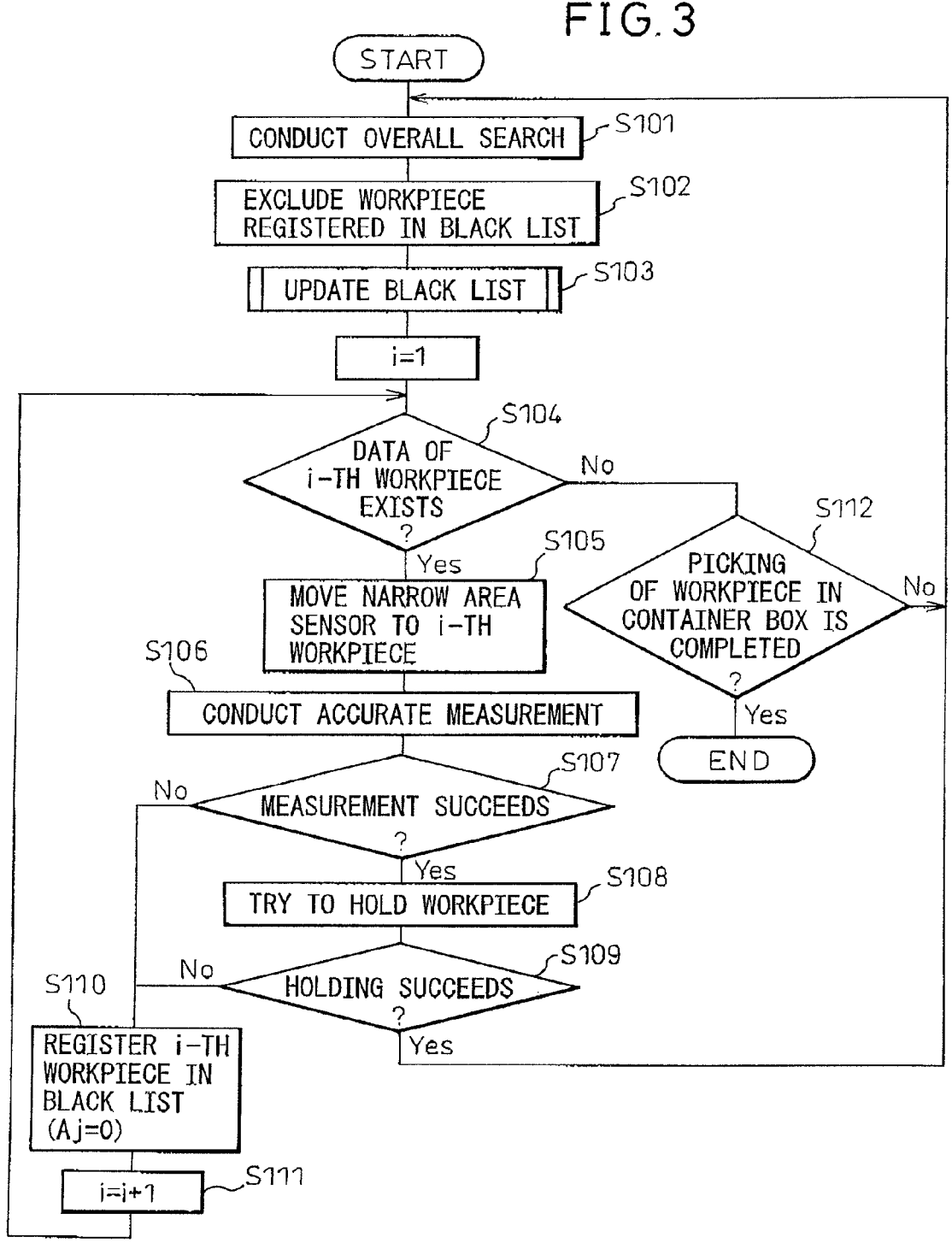
FIG. 3 is a flowchart showing a procedure of a workpiece picking process carried out by the workpiece picking apparatus according to the present invention.

Next, with reference to FIG. 3, the procedure of picking the workpiece W by the workpiece picking apparatus 11 shown in FIGS. 1 and 2 will be described. First, in step S101, the workpiece recognition device 25 conducts the overall search. The overall search is conducted according to the procedure described below. The whole container box 23 is imaged by the wide area sensor 15 arranged above the container box 23, and the obtained image or two-dimensional imaging data is processed by the image processing device 19. In this way, individual workpieces W included in the workpiece group loaded in the container box 23 are recognized thereby to detect information on the rough position (Vt, Hz), angle θ and the size S of each workpiece W, etc. The information on the rough position, etc., of each workpiece W thus detected (hereinafter referred to as workpiece data) is stored in the data storage unit 31 through the data retrieving unit 29 of the control device 21. The workpiece select unit 37, based on the workpiece data for each workpiece W stored in the data storage unit 31, determines the priority order of the workpiece W to be picked, by a predetermined method, and prepares an overall search workpiece data list in which the workpiece data are arranged according to the priority order as shown in FIG. 4. This data list is stored in the data storage unit 31. Each workpiece data is referred to as "the i-th workpiece data" by the index i in FIG. 4. Also, in the overall search workpiece data list shown in FIG. 4, Vt designates the vertical coordinate value of the position on the image of each workpiece W recognized by the workpiece recognition device 25, Hz designates the horizontal coordinate value of the position on the image of each workpiece W recognized by the workpiece recognition device 25, the angle θ designates the relative rotation angle of the imaged workpiece W relative to a workpiece template taught in advance to the image processing device 19, and the size S designates the ratio of the size of the imaged workpiece W to the size of the workpiece template taught in advance to the image processing device 19. Incidentally, the priority order can be determined using, for example, the known method described in Japanese Unexamined Patent Publication No. 2004-50390, and the method of determining the priority order is not described in detail herein.

Next, in step S102, the workpiece select unit 37 compares the overall search workpiece data list stored in the data storage unit 31 with the black list stored in the NG workpiece storage unit 35, and excludes the workpiece data of the workpiece W corresponding to the NG workpiece Wf registered in the black list from the overall search workpiece data list, not to use the excluded workpiece data in the subsequent process. The black list stored in the NG workpiece storage unit 35 is used to accumulate the workpiece data on the NG workpiece Wf for which the accurate measurement or workpiece picking described later has failed. In relation to the j-th workpiece Wf referred to by index j, the black list, as shown in FIG. 5, has registered therein information not only on the rough position (Vt, Hz), angle θ and size S but also on the number Aj of times the workpiece W is residing in the black list and the number Bj of times the workpiece recognized by the overall search has failed to correspond to the NG workpiece Wf in the black list. The "number of times" is defined as the number counted up each time the step of updating the black list in FIG. 3 described later is executed.

The excluding step S102 described above will be described in detail, taking the data of the overall search workpiece data list and black list shown in FIGS. 4 and 5 as an example. The description will be made under the assumptions that k workpieces W are recognized by the workpiece recognition device 25 in the overall search of step S101, the overall search workpiece data list as shown in FIG. 4 is created by the workpiece select unit 37 of the control device 21, and the black list with m NG workpieces Wt as shown in FIG. 5 registered therein is stored in the NG workpiece storage unit 35 of the control device 21 immediately before the overall search. When the comparison between the workpiece data of the overall search workpiece data list and the workpiece data of the black list shows that the error between the workpiece data of the two list is within a predetermined error tolerance, the workpiece select unit 37 estimates that the two workpiece data represent the same workpiece and selects the same workpiece or workpieces common in the overall search workpiece data list and the black list. The error tolerance is predetermined, for example, as ±3 pixels for the position Vt, Hz, ±3° for the angle θ, and ±3% for the size S. In this case, the comparison between the second (i=2) workpiece W in the overall search workpiece data list and the third (j=3) NG workpiece Wf in the black list shows that the positions, angles and sizes thereof are nearly equivalent to each other and are within the predetermined error tolerance. Therefore, the two corresponding workpiece data are estimated to represent the same workpiece W. When the same workpiece W is detected in this way, the second workpiece data is deleted from the overall search workpiece data list. This process is executed comprehensively between the overall search workpiece data list and the black list.

Figure 6:
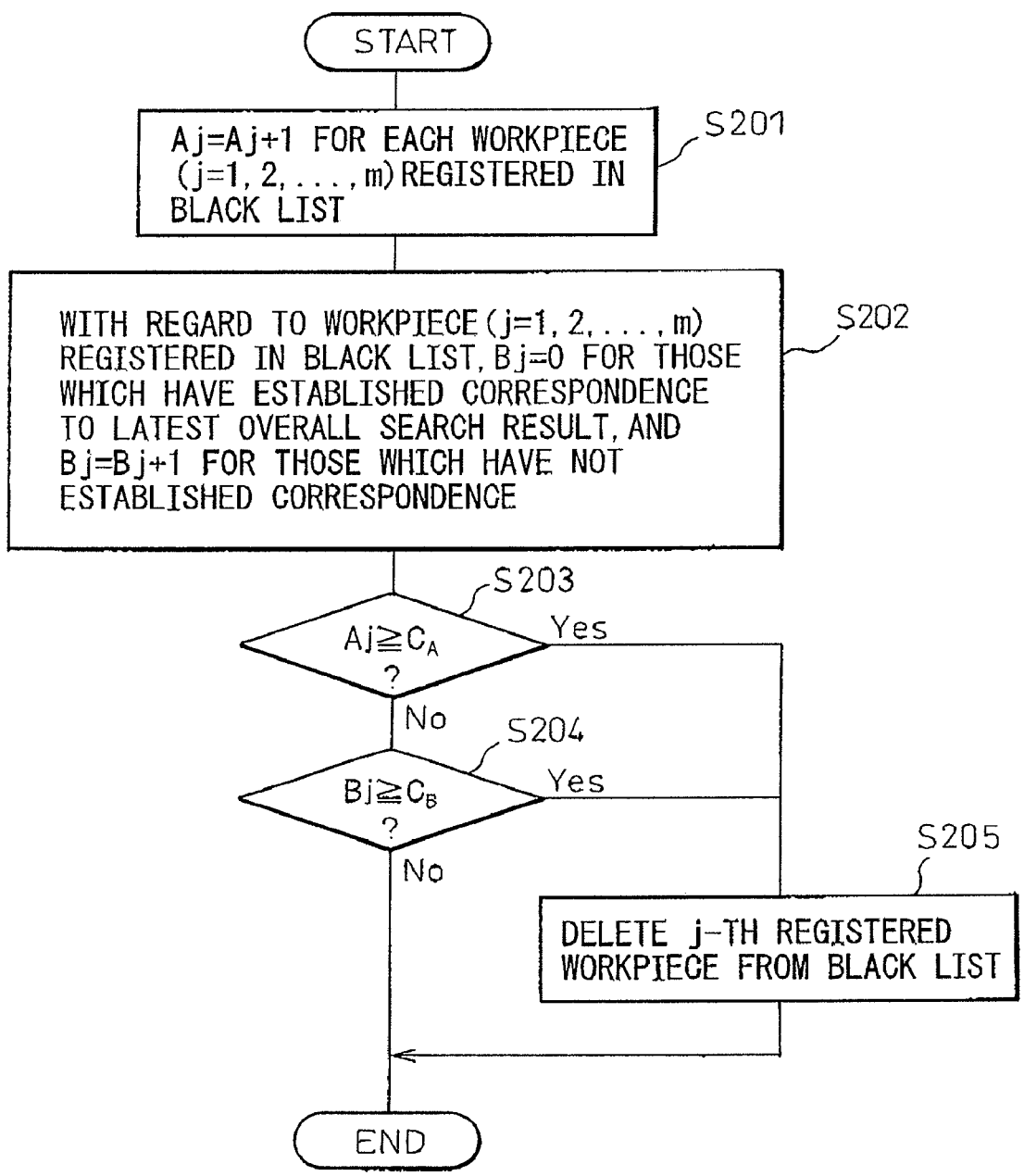
FIG. 6 is a flowchart showing the detail of the steps of updating the black list of FIG. 3.

Next, the black list is updated in step S103. The detailed procedure of updating the black list is shown in FIG. 6. First, each time the black list update step S103 is started, "1" is added to the value of $A_j$ of each workpiece data in the black list (step S201). As described later, when either the accurate measurement or the operation of holding and picking the workpiece W does not succeed, the workpiece data of the NG workpiece Wf that has not succeeded is registered in the black list together with $A_j=0$ and $B_j=0$. Therefore, the value $A_j$ indicates the number of times the workpiece data of each NG workpiece Wf is residing in the black list, i.e. the number of times the black list update step S103 is executed while the workpiece data of each NG workpiece Wf remains registered in the black list. Also, with regard to the NG workpiece Wf in the black list which has established the correspondence with the workpiece in the overall search workpiece data list in step S102 executed immediately before the black list update step S103 (i.e. the NG workpiece Wf in the black list for which the corresponding identical workpiece has been found in the overall search workpiece data list), the value $B_j$ of the workpiece data is reset to 0, while with regard to the NG workpiece Wf which has failed to establish the correspondence with any workpiece in the overall search workpiece data list (i.e. the NG workpiece Wf in the black list for which the corresponding identical workpiece has not been found in the overall search workpiece data list), 1 is added to the value of $B_j$ of the workpiece data (step S202).

Next, the value of $A_j$ of the workpiece data of each NG workpiece Wf is compared with a predetermined constant $C_A$ (step S203). When the value of $A_j$ is equal to or larger than the constant $C_A$, this workpiece data of the NG workpiece Wf is deleted from the black list (step S205). Thus, the workpiece data of the NG workpiece Wf in the black list is deleted from the black list after being used $C_A$ times as a black list data. The value equal to or more than 1 is normally set as $C_A$. Then, the value of $B_j$ of the workpiece data of each NG workpiece Wf is compared with the constant $C_B$ (step S204). When the value of $B_j$ is equal to or larger than $C_B$, the workpiece data of this NG workpiece Wf is deleted from the black list (step S205). The NG workpiece Wf in the black list for which the correspondence with the workpiece in the overall search workpiece data list has failed to be established the number $C_B$ of times is estimated to have changed in position, etc., for some reason or other. Therefore, the workpiece data of this NG workpiece Wf is determined as not required to be kept in the black list, and deleted from the black list in step S205. $C_B$ is normally set to a value equal to or more than 1. Incidentally, by setting $C_A$ or $C_B$ to a sufficiently large value, the function of deleting the workpiece data of the NG workpiece Wf from the black list can be substantially disabled.

After the black list is updated in step S103, the accurate measurement and the picking of the workpiece w recognized by the workpiece recognition device 25 are conducted. First, the workpiece select unit 37 confirms whether or not the workpiece data of the workpiece W having the top priority (j=1) in the overall search workpiece data list, after exclusion of the workpiece data of the NG workpiece Wf registered in the black list, exists in the overall search workpiece data list (step S104). If such workpiece data exists, the workpiece select unit 37 selects this workpiece W as one to be accurately measured and picked, and supplies the robot control unit 33 with the workpiece data of the first workpiece W in the overall search workpiece data list. The robot control unit 33 controls the robot 13, based on the workpiece data thus supplied (especially, the rough position (Vt, Hz) of the workpiece W), to move the narrow area sensor 17 of the accurate measurement device 27 to above the neighborhood of the selected workpiece W (step S105). Once the narrow area sensor 17 is moved to above the neighborhood of the selected workpiece W, the accurate measurement device 27 images the workpiece by the narrow area sensor 17 and executes the accurate measurement of the three-dimensional position and orientation, etc., of the selected workpiece W, based on the obtained image or three-dimensional imaging data of the workpiece W (step S106).

Next, in step S107, it is confirmed as to whether or not the accurate measurement has succeeded. When the accurate measurement has succeeded, the robot control unit 33 subsequently controls the robot 13, based on the measured three-dimensional position and orientation of the workpiece W, to hold the selected workpiece W by the robot 13 and pick it from the container box 23, in order to try to transport it to the next step, etc. (step S108). Then, in step S109, it is confirmed as to whether or not the holding and picking of the workpiece W has succeeded. When the holding and picking of the workpiece W has succeeded, the process is returned again to step S101 to conduct the overall search and repeat the process of steps S101 to S109 until no pickable workpiece W remains. Each time the picking of the workpiece W is completed, the overall search is conducted. Therefore, even if the state of each workpiece W is changed by the vibration or agitation caused by the picking operation, the latest position of each workpiece W can be newly detected. On the other hand, when either the accurate measurement of the workpiece W or the holding and picking of the workpiece W has failed, this failed workpiece is determined as NG workpiece Wf. Then, the workpiece data of this workpiece W in the overall search workpiece data list is additionally registered, as new (m+1)-th NG workpiece Wf, in the black list stored in the NG workpiece storage unit 35, with $A_{m+1}=0$ and $B_{m+1}=0$ being set (step S110). Thus, the failed workpiece is excluded from the list of the workpiece to be accurately measured and picked in the next cycle started with step S101, while at the same time adding 1 to i, followed by returning the process to step S104 (step S111). Then, the workpiece W having the next highest priority order in the overall search workpiece data list is processed by steps S104 to S109.

The steps S104 to S109 are repeated until the holding and picking of workpiece W succeed. However, if no workpiece having not failed to be accurately measured or picked is not left in the overall search workpiece data list, the process proceeds to step S112 to confirm whether or not the picking of the workpiece W in the container box 23 is completed. When the picking is not yet completed, the process returns again to step S101 for overall search in order to confirm whether or not the workpiece W, the state of which has changed due to the vibration or agitation effect associated with the picking of another workpiece W so that the accurate measurement and picking have become possible, exists. On the other hand, when the picking of all of the workpieces W is completed, the picking process executed by the workpiece picking apparatus is finished.

As described above, with the workpiece picking apparatus 11 according to the present invention, the NG workpiece Wf for which the accurate measurement by the accurate measurement device 27 or the holding and picking by the robot 13 has failed at least in the immediately preceding picking cycle is excluded from the group of workpieces W recognized by the workpiece recognition device 25, and the accurate measurement and the picking are conducted for the remaining workpieces W. Therefore, a repeated failure for the same NG workpiece Wf is prevented. As a result, the wasteful trial is eliminated thereby to improve the working efficiency. Further, with the workpiece picking apparatus 11 according to the present invention, the NG workpiece Wf kept registered in the black list during certain cycles and the NG workpiece Wf having no corresponding one among the workpieces W recognized in the overall search are deleted from the black list. Therefore, the adverse effect on the subsequent process is avoided which otherwise might be caused by the fact that the workpiece data which become unnecessary due to the workpiece loading state change etc., caused by the vibration or agitation effect associated with the picking of another workpiece W, or in other words, what is called dummy workpiece data which is in the absence of the real workpiece existing as NG is retained in the black list to the degree more than necessary. As an example of the adverse effect, in the case where the workpiece data of the workpiece W recognized newly by the overall search happens to have a value similar to the dummy data described above, the accurate measurement of the workpiece W is not conducted. The present invention can avoid such an adverse effect. As a result, the greatest number possible of workpieces W can be pick from the container box 23, and the inefficiency of working due to the increased number of NG workpieces Wf can be suppressed.

Although the workpiece picking apparatus 11 according to the present invention has been described above based on the embodiment shown in FIG. 2, it is not limited to the shown embodiment. For example, the embodiment shown in FIG. 2 uses the three-dimensional visual sensor as the narrow area sensor 17, and the three-dimensional position and orientation of the workpiece are measured based on the three-dimensional imaging data from the three-dimensional visual sensor. However, a two-dimensional imaging device such as a CCD camera or a CMOS camera may be used instead of the three-dimensional visual sensor, and may be moved by the robot 13 to take images of the workpiece from a plurality of viewpoints, so that the three-dimensional position and orientation of the workpiece W may be determined using what is called stereo vision. Also, in the embodiment described above, the rough position (Vt, Hz), angle $\theta$ and size S of the workpiece W are detected as workpiece data by the workpiece recognition device. However, it is only necessary to detect at least the rough position. Therefore, in spite of the fact that the three-dimensional position and orientation of the workpiece W are measured during the accurate measurement using the accurate measurement device, it is required only to measure at least the three-dimensional position.

Figure 7:
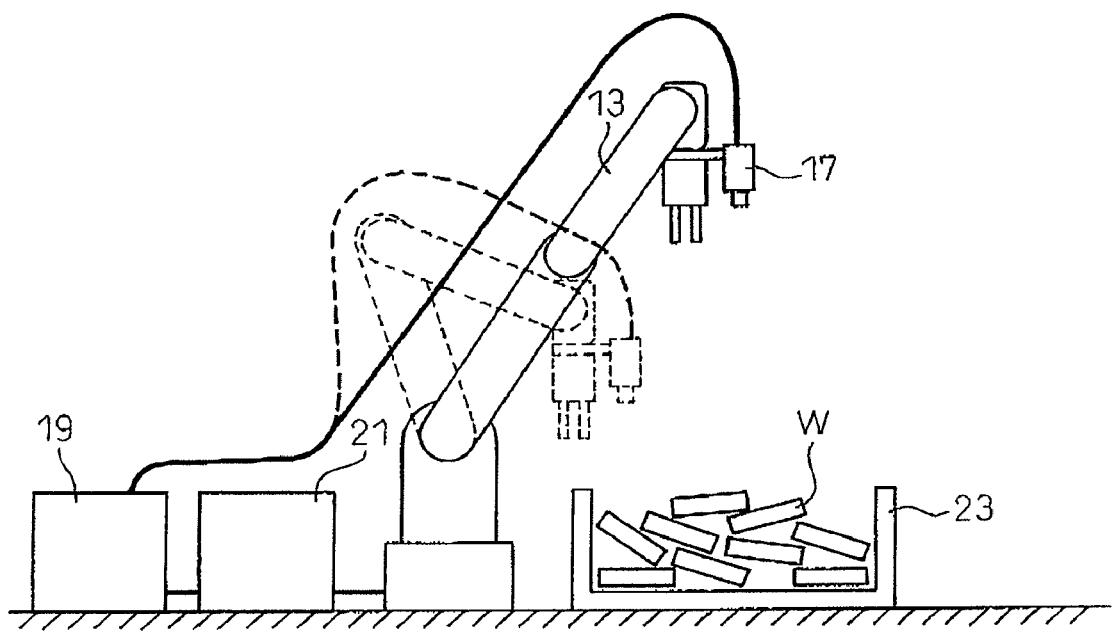
FIG. 7 is a diagram showing a workpiece picking apparatus according to another embodiment of the present invention.
Figure 8A:
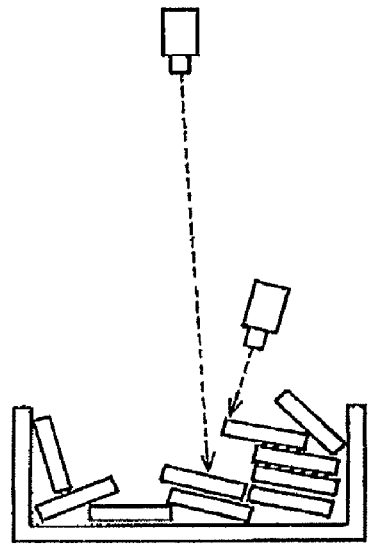
FIGS. 8A to 8C are diagrams explaining examples of a failure in accurate measurement and picking.
Figure 8B:
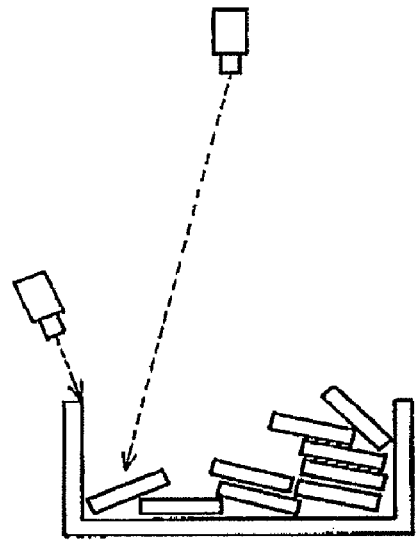
Figure 8C:
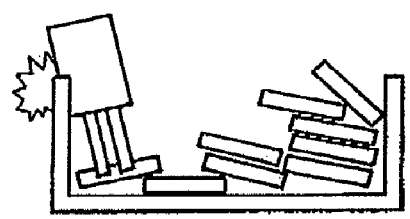

Further, in the embodiment shown in FIG. 2, the wide area sensor 15 and the narrow area sensor 17 are provided separately from each other, and the workpiece recognition device 25 and the accurate measurement device 27 are configured as separate devices. However, the narrow area sensor 17 may be also used as the wide area sensor 15, and the workpiece recognition device 25 and the accurate measurement device 27 may be configured by the same device. In such a case, overall search is conducted by the workpiece recognition device 25 in such a manner as indicated by solid line in FIG. 7, the narrow area sensor 17 is moved to a high position where the whole container box 23 can be covered in a visual field, thereby to image the workpiece W in a wide area, while the accurate measurement is conducted by the accurate measurement device 27 in such a manner as indicated by dotted line in FIG. 7, the narrow area sensor 17 is approached to the vicinity of the selected workpiece W to image the workpiece W. In FIG. 7, the parts corresponding to those shown in FIG. 2 are designated by the same reference numerals, respectively.

What is claimed:

1. A workpiece picking apparatus comprising a robot for holding the workpiece, a workpiece recognition device for recognizing the rough positions of individual workpieces included in a group of workpieces located within a relatively wide area, an accurate measurement device for accurately measuring the three-dimensional position of a workpiece in a relatively narrow area, and a workpiece select device for selecting the workpiece to be picked from the group of workpieces, said accurate measurement device accurately measuring the three-dimensional position of the workpiece selected by said workpiece select device, said robot picking the selected workpiece from the group of workpieces based on the three-dimensional position of the workpiece measured by said accurate measurement device, wherein said workpiece picking apparatus further comprises an NG (no good) workpiece storage device storing information on the rough position of a failed workpiece when said accurate measurement device has failed the measurement of the three-dimensional position of the workpiece or said robot has failed the picking of the workpiece, said workpiece select device excluding the failed workpiece, for which the measurement of the three-dimensional position or the picking has failed, from the group of workpieces recognized by said workpiece recognition device, based on the information on the rough position of individual workpieces recognized by said workpiece recognition device and the information stored in said NG workpiece storage device, and selecting the next workpiece to be measured by said accurate measurement device.

2. The workpiece picking apparatus according to claim 1, wherein said accurate measurement device is configured to further measure the orientation of the selected workpiece.

3. The workpiece picking apparatus according to claim 1, wherein said NG workpiece storage device is configured to compare the information on the rough position of the failed workpiece stored in said NG workpiece storage device with the information on the rough position of each of the group of workpieces recognized by said workpiece recognition device and, when the workpiece corresponding to the failed workpiece stored in said NG workpiece storage device does not exist in the group of workpieces recognized by said workpiece recognition device, delete the information on this failed workpiece.

4. The workpiece picking apparatus according to claim 1, wherein said NG workpiece storage device is configured to compare the information on the rough position of the failed workpiece stored in said NG workpiece storage device with the information on the rough position of each of the group of workpieces recognized by said workpiece recognition device and, when it is continuously confirmed a predetermined number of times that the workpiece corresponding to the failed workpiece stored in said NG workpiece storage device does not exist in the group of workpieces recognized by said workpiece recognition device, delete the information on this failed workpiece.

5. The workpiece picking apparatus according to claim 1, wherein said NG workpiece storage device is configured to delete the information on the failed workpiece when a cycle from the step of recognizing the group of workpieces by said workpiece recognition device to the step of picking the workpiece by said robot is repeated a predetermined number of times after the information on the rough position of the failed workpiece for which the measurement of the three dimensional position or the picking has failed is stored.

6. The workpiece picking apparatus according to claim 1, wherein said workpiece recognition device and said accurate measurement device are incorporated in the same device.

7. The workpiece picking apparatus according to claim 2, wherein said NG workpiece storage device is configured to compare the information on the rough position of the failed workpiece stored in said NG workpiece storage device with the information on the rough position of each of the group of workpieces recognized by said workpiece recognition device and, when the workpiece corresponding to the failed workpiece stored in said NG workpiece storage device does not exist in the group of workpieces recognized by said workpiece recognition device, delete the information on this failed workpiece.

8. The workpiece picking apparatus according to claim 2, wherein said NG workpiece storage device is configured to compare the information on the rough position of the failed workpiece stored in said NG workpiece storage device with the information on the rough position of each of the group of workpieces recognized by said workpiece recognition device and, when it is continuously confirmed a predetermined number of times that the workpiece corresponding to the failed workpiece stored in said NG workpiece storage device does not exist in the group of workpieces recognized by said workpiece recognition device, delete the information on this failed workpiece.

9. The workpiece picking apparatus according to claim 2, wherein said NG workpiece storage device is configured to delete the information on the failed workpiece when a cycle from the step of recognizing the group of workpieces by said workpiece recognition device to the step of picking the workpiece by said robot is repeated a predetermined number of times after the information on the rough position of the failed workpiece for which the measurement of the three dimensional position or the picking has failed is stored.

10. The workpiece picking apparatus according to claim 2, wherein said workpiece recognition device and said accurate measurement device are incorporated in the same device.

* * * * *